United States Patent
Kelley

(10) Patent No.: US 9,760,609 B2
(45) Date of Patent: Sep. 12, 2017

(54) GRAPH-BASED RECOMMENDATIONS SERVICE SYSTEMS AND METHODS

(71) Applicant: HERE GLOBAL B.V., Veldhavon (NL)

(72) Inventor: Lawrence Kelley, Seattle, WA (US)

(73) Assignee: HERE Global B.V., Veldhoven (NL)

( * ) Notice: Subject to any disclaimer, the term of this patent is extended or adjusted under 35 U.S.C. 154(b) by 508 days.

(21) Appl. No.: 14/087,603

(22) Filed: Nov. 22, 2013

(65) Prior Publication Data

US 2015/0149484 A1    May 28, 2015

(51) Int. Cl.
  *G06F 17/30* (2006.01)
  *G06Q 30/06* (2012.01)
  *G06Q 30/02* (2012.01)

(52) U.S. Cl.
  CPC .... *G06F 17/3053* (2013.01); *G06F 17/30398* (2013.01); *G06Q 30/0278* (2013.01); *G06Q 30/0631* (2013.01)

(58) Field of Classification Search
  CPC .......... G06F 17/30867; G06F 17/3053; G06F 17/30958
  USPC ........ 709/204, 206, 217, 224; 707/722, 723, 707/748, 751, 706, 728, 749, E17.108, 707/724, 798, E17.011, E17.014, 707/E17.084, E17.098, 725, 732, 750, 707/754, 755, 759, 767, 769, 771, 777; 706/12, 16, 20, 25, 27, 46, 52, 55
  See application file for complete search history.

(56) References Cited

U.S. PATENT DOCUMENTS

| | | | |
|---|---|---|---|
| 6,681,218 B1 * | 1/2004 | Zou ................... | G06F 17/30327 707/696 |
| 2006/0206872 A1 * | 9/2006 | Krishnaswamy ....... | G06F 17/50 717/133 |
| 2014/0006414 A1 * | 1/2014 | Oikonomou ........ | G06F 17/3087 707/748 |

FOREIGN PATENT DOCUMENTS

| | | | | |
|---|---|---|---|---|
| CH | WO 2014002064 A1 * | 1/2014 | ....... | G06F 17/30017 |
| EP | 0522363 A2 * | 1/1993 | .......... | G06F 15/419 |
| WO | 2013050072 A1 | 4/2013 | | |

OTHER PUBLICATIONS

Daniel et al. ("Induction of Compact Decision Trees for Personalized Recommendation", SAC'06 Apr. 23-27, 2006, Dijon, France).*

(Continued)

*Primary Examiner* — Jay Morrison
*Assistant Examiner* — Ken Hoang
(74) *Attorney, Agent, or Firm* — Ditthavng & Steiner, P.C.

(57) ABSTRACT

A recommendation engine may provide recommendations by obtaining a compact graph representation representing a recommendations graph comprising of nodes and weighted edges. Each node is associated with type metadata indicating that it represents a recommendable item or a non-recommendable item. Each weighted edge is associated with edge-weight metadata. The compact graph representation can be stored in primary memory. When servicing a request for an item recommendation, the recommendation engine selects an entry node based at least in part on context metadata associated with the request, and traverses only a highly-weighted portion of the compact graph representation that is proximate to an entry node to select paths leading respectively to potential recommendation nodes. Each path is scored based on the edge-weight metadata of all segments, and at least one recommendation node is selected based at least in part on the path scores.

22 Claims, 12 Drawing Sheets

(56) References Cited

OTHER PUBLICATIONS

Marko A. Rodriguez, A Graph-Based Movie Recommender Engine, Supporting the Emerging Graph Landscape, Oct. 23, 2013, http://markorodriguez.com/2011/09/22/a-graph-based-movie-recommender-engine/ Page.
Marko A. Rodriguez and Peter Neubauer; The Graph Traversal Pattern, arXiv:1004.1001v1 [cs.DS] Apr. 7, 2010.
Sandra Álvarez, A Compact Representation of Graph Databases, MLG '10, Jul. 24-25, 2010 Washington, DC, USA.
Extended European Search Report for corresponding European Patent Application No. 14193627.8, dated Mar. 30, 2015, 9 pages.
Demovie et al. "Movie Recommendation Based on Graph Traversal Algorithms", 2013 24th International Workshop on Database and Expert Systems Applications, IEEE, Aug. 26, 2013, pp. 152-156.
Office Action for corresponding European Patent Application No. 14 193 627.8-1955, dated Jan. 3, 2017, 9 pages.

\* cited by examiner

GRAPH-BASED RECOMMENDATIONS SERVICE SYSTEMS AND METHODS

FIELD

This disclosure is directed to the field of software, and more particularly, to providing a graph-based recommendations service.

BACKGROUND

Recommendation engines seek to select content (such as music, books, movies, consumer goods, or the like), that is beneficial or interesting to a user, using a model built from the characteristics of an item (content-based approaches), characteristics and/or past behavior of the user, and/or the user's context (collaborative filtering approaches).

Recommendation engines have become common in recent years. For example, when viewing a product on an ecommerce website, some online retailers will recommend additional items based on a matrix of what other shoppers purchased when purchasing the currently viewed item. Similarly, music streaming sites may take an initial input of a song or musician and play music with similar characteristics, while video streaming sites may offer predictions of movies and/or videos that a user might like to watch based on factors such as the user's previous preferences, ratings, and watching habits (as compared to the behavior of other users), the characteristics (such as the genre) of the movie and/or video, and the like.

Recommendation engines typically produce a list of recommendations using one or a combination of two approaches: collaborative filtering and/or content-based filtering.

Collaborative filtering methods are based on collecting and analyzing a large amount of information on users' behaviors, activities, and/or preferences. Using the model thereby developed, a collaborative filtering recommendation engine predicts what users will like based on their similarity to other users.

One advantage of the collaborative filtering approach is that it does not rely on analyzing the content and therefore it is capable of accurately recommending items without requiring an "understanding" of the item itself. Many algorithms have been used in measuring user similarity or item similarity in recommender systems. For example, the k-nearest neighbor (k-NN) approach, the Pearson Correlation, and the like.

When building a model, a collaborative filtering recommendation engine may collect user-profile data in various ways, such as some or all of the following.
  Asking a user to rate an item on a sliding scale.
  Asking a user to rank a collection of items from favorite to least favorite.
  Presenting two items to a user and asking him/her to choose the better one of them.
  Asking a user to create a list of items that he/she likes.
  Observing the items that a user views in an online store.
  Analyzing item/user viewing times
  Keeping a record of the items that a user purchases online.
  Obtaining a list of items that a user has listened to or watched on his/her computer.
  Analyzing the user's social network and discovering similar likes and dislikes Collaborative filtering approaches can be problematic in certain situations. For example, a collaborative filtering recommendation engine may not be able to make accurate recommendations unless its model includes a large amount of existing data on a user.

Also, a collaborative filtering recommendation engine generally requires a large amount of computation to make recommendations when there are many thousands or millions of users and items. Due to the large computation requirements, collaborative filtering recommendation engines generally pre-compute a batch of recommendations offline, before a recommendation-request is made.

By contrast, content-based filtering methods are based on information about and characteristics of the items that are going to be recommended. Such algorithms try to recommend items that are similar to those that a user liked in the past (or is examining in the present). In particular, various candidate items are compared with items previously rated and/or encountered by the user and the best-matching items are recommended.

However, the above approaches may be unsatisfactory when a recommendation engine provides recommendations for many thousands or millions of items and users based on very little data.

DESCRIPTION

Figure 1:
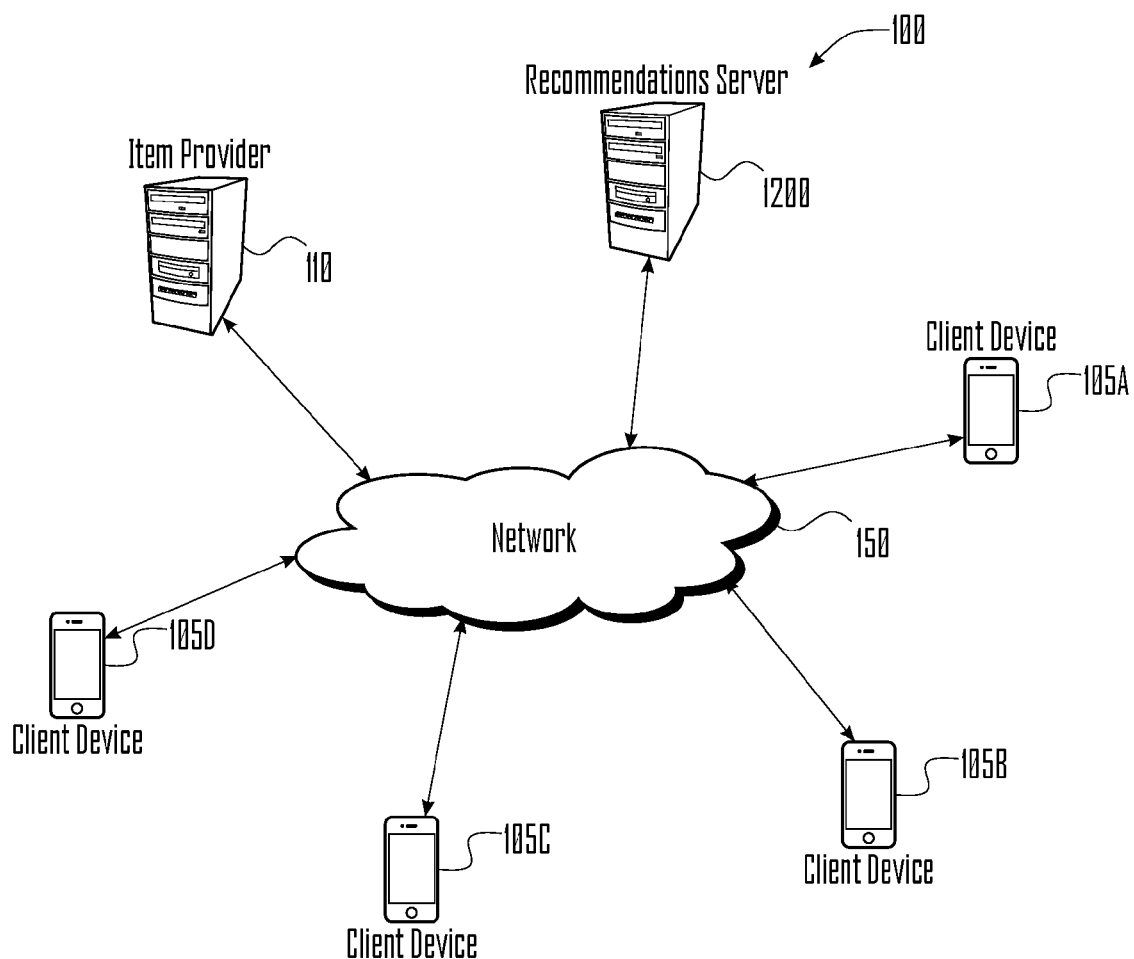
FIG. 1 illustrates a simplified graph-based recommendations system in which item provider, recommendations server, and client devices are connected to network.

In various embodiments, a recommendation engine makes recommendations by traversing a heterogeneous recommendations graph at request time. The recommendations graph includes nodes representing recommendable items; intermediate nodes representing non-recommendable joining elements; and weighted edges joining the nodes.

The recommendations directed-graph is crawled at request time in order to provide flexibility in adjusting to changes in available data and multiple contexts. Compared to offline batch processing, request-time crawling may reduce operational complexity and storage requirements, and improve accuracy.

To minimize production hardware requirements and end user wait time, a fast graph-traversing algorithm may be preferred in some situations. To that end, some embodiments may employ a compact representation of the recommendations graph that may be stored in primary memory. One embodiment uses a collection of integer arrays to represent nodes and weighted edges.

Relatedly, to avoid evaluating the entire recommendations graph, some embodiments may crawl the recommendations graph breadth-wise in batches before crawling depth-wise down to an initial configurable depth limit. If the initial depth limit is reached and the desired number of result nodes has not been gathered, the next breadth/depth batch is examined. If the entire breadth is exhausted in this way and the desired number of result nodes has still not been gathered, the algorithm can continue crawling with a higher depth limit, repeating the pattern until satisfied number of results have been selected or the maximum depth is reached.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates a simplified graph-based recommendations system in which item provider 110, recommendations server 1200, and client devices 105A-D are connected to network 150.

Item provider 110 represents a provider of recommendable items. In various embodiments, item provider 110 may provide recommendable items such as electronic media deliverables (e.g., ringtones, wallpapers, streaming and/or downloadable music and/or video, or the like), consumer goods (e.g., electronics, printed media, or the like), or the like. In other embodiments, a recommendable item may be a place of business and/or location, a person, or other item that a user may wish to obtain, visit, and/or discover. In one embodiment, item provider 110 represents a mobile network carrier that provides (among other things) purchasable items such as ringtones, wallpapers, and the like.

Recommendations server 1200 (see FIG. 12, discussed below) provides recommendations of items provided by item provider 110. In some embodiments, recommendations server 1200 may be operated by a third-party recommendations service. In other embodiments, some or all of the functionality described as being provided by recommendations server 1200 may be provided by item provider 110.

In various embodiments, network 150 may include the Internet, a local area network ("LAN"), a wide area network ("WAN"), and/or other data network.

In various embodiments, client devices 105A-D may include desktop PCs, mobile phones, laptops, tablets, or other computing devices that are capable of connecting to network 150 and consuming services such as those described herein.

In various embodiments, additional infrastructure (e.g., cell sites, routers, gateways, firewalls, and the like), as well as additional devices may be present. Further, in some embodiments, the functions described as being provided by some or all of item provider 110 and recommendations server 1200 may be implemented via various combinations of physical and/or logical devices. However, it is not necessary to show such infrastructure and implementation details in FIG. 1 in order to describe an illustrative embodiment.

Figure 2:
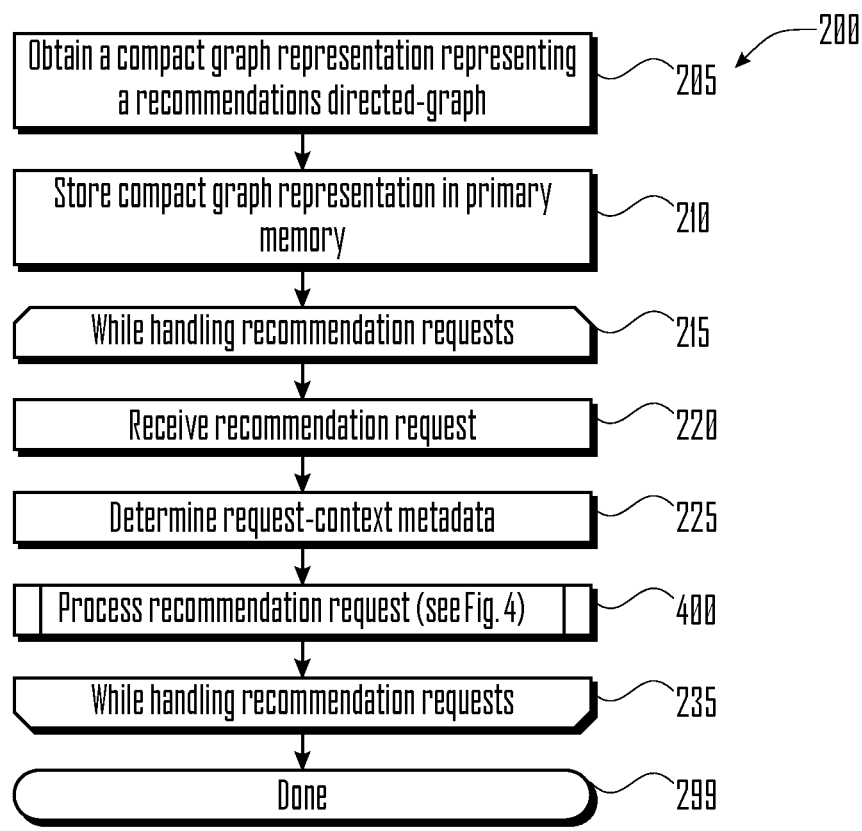
FIG. 2 illustrates a recommendations-service routine for providing a recommendations service, such as may be performed by a recommendations server in accordance with one embodiment.

FIG. 2 illustrates a recommendations-service routine 200 for providing a recommendations service, such as may be performed by a recommendations server 1200 in accordance with one embodiment.

In block 205, recommendations-service routine 200 obtains a compact graph representation representing a recommendations graph. The recommendations graph includes many nodes and many weighted edges. Each node is associated with type metadata indicating that each node represents one of a multiplicity of non-recommendable items or one of many recommendable items. Each weighted edge joins a source node to a target node.

Each weighted edge is also associated with edge-weight metadata that indicates a strength of the connection between the source node and the target node. See, for example, directed graph visualization 300 (see FIG. 3, discussed below).

In block 210, recommendations-service routine 200 stores the compact graph representation in primary memory, such as primary memory 1225 (see FIG. 12, discussed below).

Recommendations-service routine 200 iterates from opening loop block 215 to ending loop block 235 while handling recommendation requests.

In block 220, recommendations-service routine 200 receives a recommendation request from a remote client device. Typically, recommendations-service routine 200 receives such a recommendation request via an application programming interface ("API") that enables the remote client device to send requests and associated metadata.

In block 225, recommendations-service routine 200 determines request-context metadata associated with the recommendation request received in block 220. In various embodiments, the request-context metadata may include data such as a user identifier identifying a user to whom a recommendation will be provided, an item identifier identifying a recommendable item that the user is currently viewing and/or currently indicating an interest in, a current date and/or time, current physical location, current state of the application or the like.

In subroutine block 400, recommendations-service routine 200 calls subroutine 400 (see FIG. 4, discussed below) to process the recommendation request received in block 220.

In ending loop block 235, recommendations-service routine 200 iterates back to opening loop block 215 if it is still handling recommendation requests.

Once recommendations-service routine 200 is finished handling recommendation requests, recommendations-service routine 200 ends in ending block 299.

Figure 3:
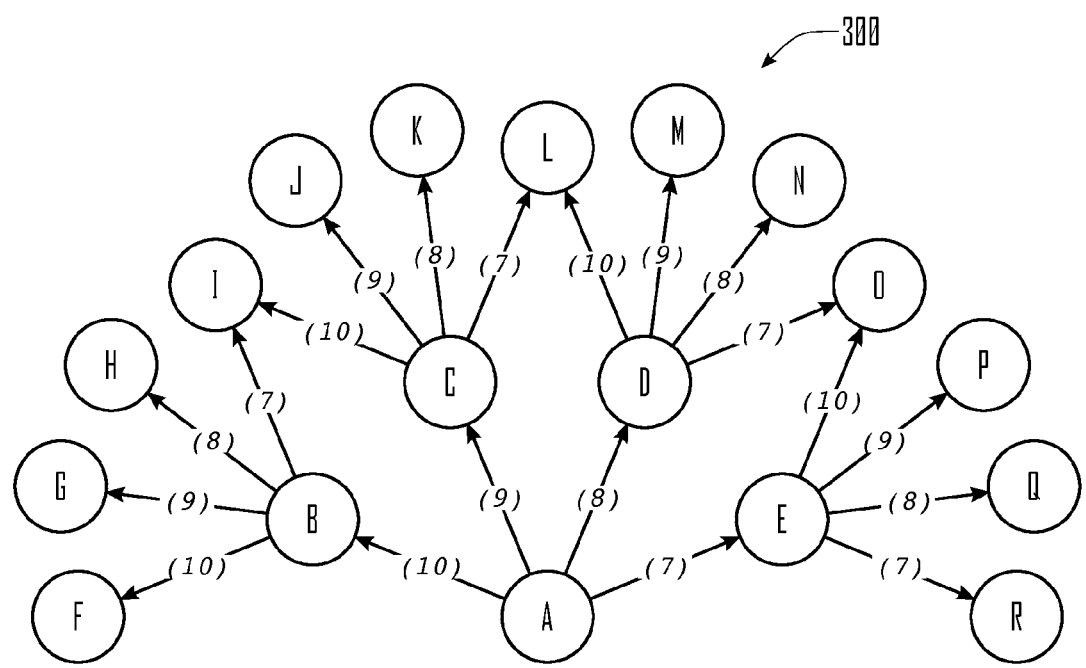
FIG. 3 illustrates a directed graph visualization of a tiny directed graph that is used as an example to illustrate the graph-traversal process shown in FIG. 4.
Figure 4:
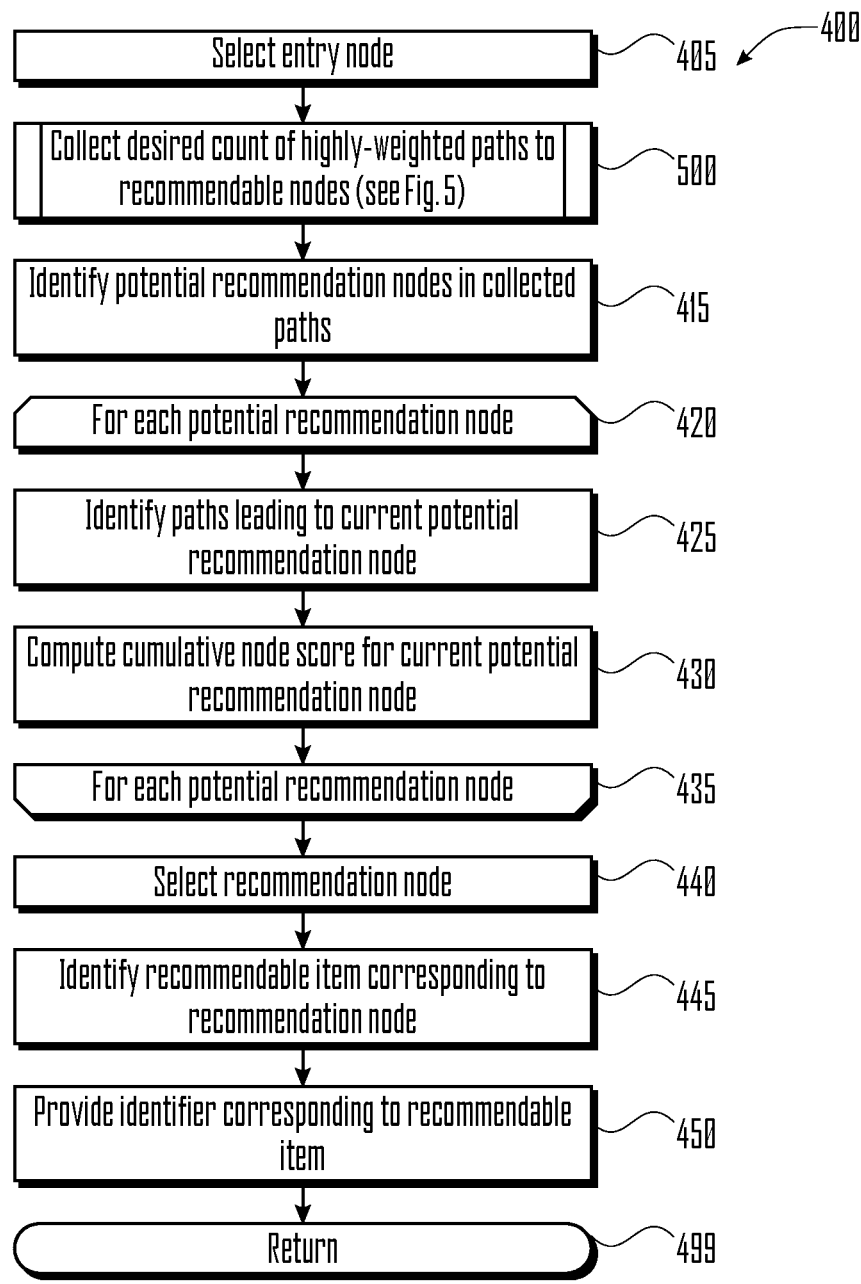
FIG. 4 illustrates a recommendations-request subroutine for processing a recommendation request requesting an item recommendation for a remote user based at least in part on request-context metadata associated with a given recommendation request, such as may be performed by a recommendations server in accordance with one embodiment.

FIG. 3 illustrates a directed graph visualization 300 of a tiny directed graph that is used as an example to illustrate the graph-traversal process shown in FIG. 4. In directed graph visualization 300, nodes are depicted as circles. The recommendations directed-graph illustrated in directed graph visualization 600 contains eighteen nodes, labeled 'A' through 'R'. Nodes 'A' and 'F' through 'R' represent recommendable items. Nodes 'B' through 'E' are joining nodes representing non-recommendable items. In the example scenario discussed below, non-recommendable-item nodes represent users and recommendable-item nodes represent electronic goods, such as ringtones. In other embodiments, recommendable-item nodes may represent other types of goods, services, locations, persons, or other recommendable things, and non-recommendable-item nodes may represent linking entities other than users.

Edges between the nodes are depicted with arrows. Each weighted edge is also associated with edge-weight metadata (here, shown as parenthesized integers) that indicates a strength of the connection between the source node and the target node. For example, if node 'B' represents a non-recommendable item such as a user, and nodes 'F', 'G', 'H', and 'I' represent recommendable items such as ringtones, the weighted edges [BF], [BG], [BH], and [BI] may represent different types of interactions that the user may have had with the respective ringtones. For example:

the weighted edge [BF] (with a weight value of 10) may represent an interaction in which the user purchased the ringtone represented by node 'F';

the weighted edge [BG] (with a weight value of 9) may represent an interaction in which the user added the ringtone represented by node 'G' to a shopping cart;

the weighted edge [BH] (with a weight value of 8) may represent an interaction in which the user 'liked' and/or commented on the ringtone represented by node 'H'; and the weighted edge [BI] (with a weight value of 7) may represent an interaction in which the user viewed/ played/previewed ringtone represented by node 'I'.

Alternately, the weighted edges [BF], [BG], [BH], and [BI] may represent interactions that the user may have had with the respective ringtones at different dates and/or times. For example:

the weighted edge [BF] (with a weight value of 10) may represent an interaction in which the user purchased the ringtone represented by node 'F' zero days ago;

the weighted edge [BG] (with a weight value of 9) may represent an interaction in which the user purchased the ringtone represented by node 'G' one day ago;

the weighted edge [BH] (with a weight value of 8) may represent an interaction in which the user purchased the ringtone represented by node 'H' five days ago; and the weighted edge [BI] (with a weight value of 7) may represent an interaction in which the user purchased the ringtone represented by node 'I' ten days ago.

In other embodiments, the edge-weight metadata may represent different types of interactions and/or be determined according to multiple factors that collectively indicate a strength of the connection between a source node and a target node. In some embodiments, edges may not be interaction-based, but may be based on similarity metrics or other algorithms. In some embodiments, a weighted edge may be associated with multiple edge-weight metadata factor values (e.g., an interaction type and a date and/or time stamp), from which an edge weight may be determined at request time.

FIG. 4 illustrates a recommendations-request subroutine 400 for processing a recommendation request requesting an item recommendation for a remote user based at least in part on request-context metadata associated with a given recommendation request, such as may be performed by a recommendations server 1200 in accordance with one embodiment.

In block 405, recommendations-request subroutine 400 selects an entry node based at least in part on the request-context metadata. For example, in one embodiment, the given recommendation request may include an item identifier identifying a recommendable item that a remote user is currently viewing or otherwise indicating some interest in. In some embodiments, recommendations-request subroutine 400 may select multiple entry nodes and process them in series or parallel as discussed below.

In subroutine block 500, using a compact graph representation in primary memory, such as primary memory 1225 (see FIG. 12, discussed below), recommendations-request subroutine 400 calls subroutine 500 (see FIG. 5, discussed below) to collect desired count of highly-weighted paths to recommendable nodes from only a portion of the recommendations directed-graph that is reachable from the entry node (as selected in block 405) via only highly-weighted paths of configurable lengths. For example, in one embodiment, subroutine 500 may traverse a portion of the recommendations directed-graph shown in directed graph visualization 300 and return paths [ABF], [ABG], [ABH], [ABI], [ACI], [ACJ], [ADL], [ADM], [AEO], and [AEP].

In block 415, recommendations-request subroutine 400 identifies potential recommendation nodes that terminate the collected paths. For example, in one embodiment, if graph-traversal subroutine 500 returns paths [ABF], [ABG], [ABH], [ABI], [ACI], [ACJ], [ADL], [ADM], [AEO], and [AEP], in block 415, recommendations-request subroutine 400 may identify potential recommendation nodes 'F', 'G', 'H', 'I', 'J', 'L', 'M', 'O', and 'P'.

Beginning in opening loop block 420, recommendations-request subroutine 400 processes each potential recommendation node in turn.

In block 425, recommendations-request subroutine 400 identifies one or more paths among those collected in subroutine block 500 that lead to the current potential recommendation node. For example, when processing node 'F', recommendations-request subroutine 400 may identify path [ABF], but while processing node 'I', recommendations-request subroutine 400 may identify both of paths [ABI] and [ACI].

In block 430, recommendations-request subroutine 400 computes a cumulative node score for the current potential recommendation node based at least in part on edge-weight metadata associated with each edge of each path identified in block 425. In various embodiments, various formulas may be employed for computing a cumulative node score given a set of weighted edge weight values. For example, in one embodiment, recommendations-request subroutine 400 may simply average the weight values of each weighted edge in the path. In other embodiments, recommendations-request subroutine 400 may exponentially decay or otherwise discount weighted edge weights based on a weighted edge's distance from the source node of the path. For example, when processing node 'F', and having identified path [ABF], recommendations-request subroutine 400 may compute a cumulative node score of 10 (using a formulas that takes a simple average of each weighted edge weight in the path).

In some cases, the current potential recommendation node may be reached via multiple paths. In such cases, recommendations-request subroutine 400 may simply compute a path weight for each path using methods such as those described above, then combine the individual path weights by simple addition or otherwise. For example, while processing node 'I', recommendations-request subroutine 400 may respectively compute individual path weights of 8.5 and 9.5 (using a simple average) for paths [ABI] and [ACI], then combine the individual path weights (using simple addition) to compute a cumulative node score of 18 for node 'I'.

In ending loop block 435, recommendations-request subroutine 400 iterates back to opening loop block 420 to process the next potential recommendation node, if any.

Once all potential recommendation nodes have been scored, in block 440, recommendations-request subroutine 400 selects at least one recommendation node based at least in part on the cumulative node scores computed in iterations of block 430. For example, in one embodiment, recommendations-request subroutine 400 may order the potential recommendation nodes according to the cumulative node scores computed in block 430, then select one or more nodes from the top.

In block 445, recommendations-request subroutine 400 identifies a recommendable item corresponding to the recommendation node selected in block 440. For example, if in block 440, recommendations-request subroutine 400 selected node 'I', then in block 445, recommendations-request subroutine 400 may use a map, query, or other method to identify the item to which node 'I' corresponds. For example, node 'I' may correspond to a particular ringtone by a particular artist, which can be purchased by the user for a particular price.

In block 450, recommendations-request subroutine 400 provides an identifier corresponding to the recommendable item identified in block 445, such that the particular item may be presented as a recommendation to the user.

Recommendations-request subroutine 400 ends in ending block 499, returning to the caller.

Figure 5:
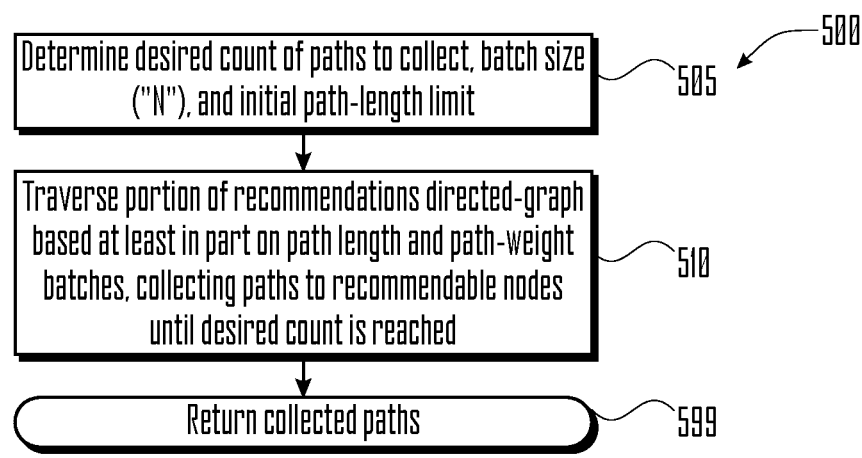
FIG. 5 illustrates a graph-traversal subroutine for collecting paths from a portion of a recommendations directed-graph proximate to a given entry node for a given batch size, and a given depth limit, such as may be performed by a recommendations server in accordance with one embodiment.

FIG. 5 illustrates a graph-traversal subroutine 500 for collecting paths from a portion of a recommendations graph proximate to a given entry node for a given batch size ("N"), and a given depth limit, such as may be performed by a recommendations server 1200 in accordance with one embodiment.

Given the structure of the graph, which contains recommendable nodes joined by intermediate non-recommendable nodes, no target recommendable nodes are expected to be found at the distance of just one edge from an entry point. (In other embodiments, recommendable nodes may be joined by zero or more non-recommendable nodes.) However, in some cases, the entry node and some or all of the immediately adjacent intermediate nodes may have a large number of outgoing edges, such that queuing and evaluating all of them might require a large amount of time and space.

To avoid evaluating the entire local graph, graph-traversal subroutine 500 crawls breadth-wise in batches of size "N" before crawling depth-wise down to an initial depth limit. If the initial depth limit is reached and the desired number of result nodes has not been gathered, the next breadth/depth batch is examined. If the entire breadth is exhausted in this way and the desired number of result nodes has still not been gathered, the algorithm can continue crawling with a higher depth limit, repeating the pattern until satisfied or the maximum depth is reached.

To that end, determines a desired count of paths to collect, a batch size ("N"), and an initial path-length limit. In the example scenario using directed graph visualization 3, a desired path-count of 10, a batch size of 2, and an initial depth limit of 2 will be used. However, in many embodiments, a much larger path count (e.g., hundreds or thousands) and batch size (e.g., several hundred) may be employed.

In block 510, graph-traversal subroutine 500 traverses only a portion of the recommendations directed-graph based at least in part on path length and path-weight batches, collecting paths to recommendable nodes until desired count is reached.

For example, using the graph illustrated as directed graph visualization 300 as an example, entering the graph at node 'A' with a bread-wise batch size of 2, an initial depth limit of 2, and a desired path count of 10, graph-traversal subroutine 500 proceeds as follows, using an exemplary priority-queue-based implementation.

Node 'A' is placed in the node priority queue, which will return the node at the end of the highest weighted path first.

Node Priority Queue: ['A']

Next, the best node is examined from the node priority queue and a breadth-wise batch of paths are taken from it. Those paths are placed in the path priority queue.

Node Priority Queue: ['A']
Path Priority Queue: [AB, AC]

The path priority queue is examined until it is exhausted or the desired number of target nodes has been collected.

Next, the best path is popped from the path queue, that ending at node 'B'. Since node 'B' has edges remaining, it is added to the node priority queue. A breadth-wise batch of paths is taken from node 'B' and added to the path priority queue. Since node 'B' is not a recommendable item, the [AB] path is not collected.

Node Priority Queue: ['A', 'B']
Path Priority Queue: [AC, ABF, ABG]

The path queue is visited again, and the path to node 'C' returned. Following the pattern from node 'B' results in these queues:

Node Priority Queue: ['A', 'B', 'C']
Path Priority Queue: [ABF, ABG, ACI, ACJ]

When the path queue is next examined, the returned path contains a target node at its end, [ABF] is collected for return. Since the path length is equal to the current depth limit of 2, no further paths are taken from node 'F'. However, for demonstration purposes it is assumed that node 'F' contains outgoing edges (not shown) and, so, it is added to the node priority queue.

Node Priority Queue: ['A', 'B', 'C', 'F']
Path Priority Queue: [ABG, ACI, ACJ]
Collected Paths: [ABF]

When [ABG] is returned from the path queue, it gets the same treatment as [ABF].

Figure 6:
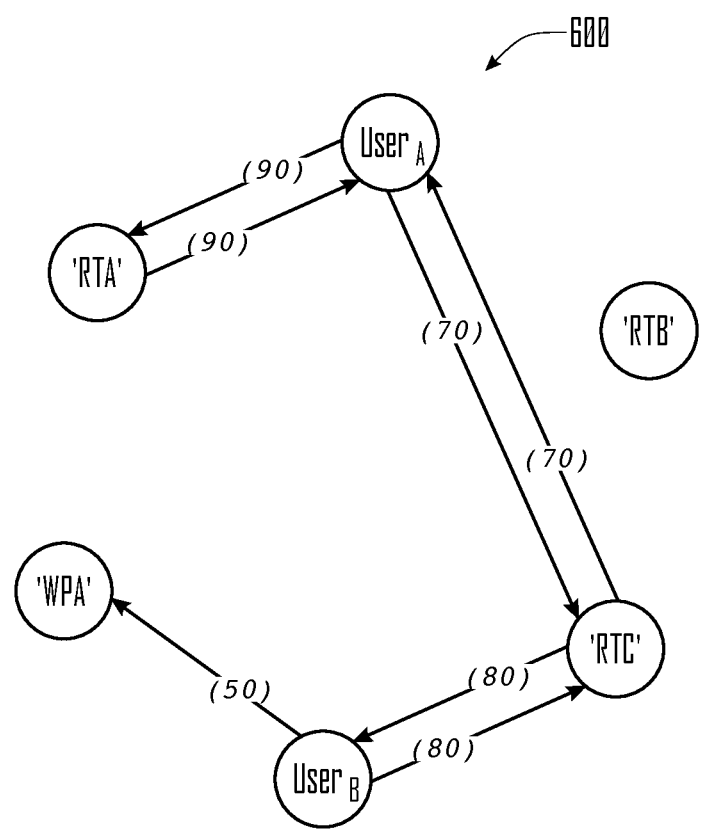
FIG. 6 illustrates a directed graph visualization of a tiny recommendations directed-graph illustrated in directed graph visualization used as an example to illustrate the graph-compacting process shown in FIG. 8.

Node Priority Queue: ['A', 'B', 'C', 'F', 'G']
Path Priority Queue: [ACI, ACJ]
Collected Paths: [ABF, ABG]
Paths [ACI] and [ACJ] are also treated the same. Here are the queues after processing both of them:
Node Priority Queue: ['A', 'B', 'C', 'F', 'G', 'I', 'J']
Path Priority Queue: [ ]
Collected Paths: [ABF, ABG, ACI, ACJ]
Note that the path queue is empty after [ACJ] comes off. At this point, since the desired number of nodes has not been found and the batch trigger depth has been reached, the node priority queue is revisited and another breadth-wise batch of paths is taken from node 'A'.
Node Priority Queue: ['A', 'B', 'C', 'F', 'G', 'I', 'J']
Path Priority Queue: [AD, AE]
Collected Paths: [ABF, ABG, ACI, ACJ]
Processing begins again on the path priority queue and [AD] is returned, followed by [AE]. They treated exactly as the [AB] and [AC] paths. Note the positions of nodes 'D' and 'E' in the node priority queue.
Node Priority Queue: ['A', 'B', 'C', 'D', 'E', 'F', 'G', 'I', 'J']
Path Priority Queue: [ADL, ADM, AEO, AEP]
Collected Paths: [ABF, ABG, ACI, ACJ]
When [ADL] is returned from the path queue, it terminates with a target node and since it is the batch trigger depth no additional nodes are collected from it, it is handled like [ABF] from the first breadth/depth batch. Same for [ADM].
Node Priority Queue: ['A', 'B', 'C', 'D', 'E', 'F', 'G', 'I', 'J', 'L' 'M']
Path Priority Queue: [AEO, AEP]
Collected Paths: [ABF, ABG, ACI, ACI, ADL, ADM]
Also the same for [AEO] and [AEP], leaving the path queue empty again.
Node Priority Queue: ['A', 'B', 'C', 'D', 'E', 'F', 'G', 'I', '3', 'L', 'M', 'O', 'P']
Path Priority Queue: [ ]
Collected Paths: [ABF, ABG, ACI, ACI, ADL, ADM, AEO, AEP]
Returning to the node queue, node 'A' is returned and found to have no additional edges so it is dropped. The next node is 'B', and the breadth-wise batch of 2 is collected from it.
Node Priority Queue: ['B', 'C', 'D', 'E', 'F', 'G', 'I', 'I', 'L', 'M', 'O', 'P']
Path Priority Queue: [ABH, ABI]
Collected Paths: [ABF, ABG, ACI, ACI, ADL, ADM, AEO, AEP]
Processing [ABH] and [ABI] results in meeting the desired target node count of 10 and the algorithm concluding. Note that the target node count can contain duplicates, found by crawling different paths. In this example, 2 distinct paths terminating in node T have been collected.
At this point the path queue is empty but the node queue has many remaining, with different configuration the algorithm might have continued.
Node Priority Queue: ['B', 'C', 'D', 'E', 'F', 'G', 'I', 'H', 'J', 'L', 'M', 'O', 'P']
Path Priority Queue: [ ]
Collected Paths: [ABF, ABG, ACI, ACI, ADL, ADM, AEO, AEP, ABH, ABI]
In ending block 599, graph-traversal subroutine 500 returns the collected paths.
FIG. 6 illustrates a directed graph visualization 600 of a tiny recommendations directed-graph illustrated in directed graph visualization 600 used as an example to illustrate the graph-compacting process shown in FIG. 8.

In the recommendations directed-graph illustrated in directed graph visualization 600, there are two genera of node types: 'ITEM', which is recommendable, and 'USER', which is non-recommendable. The recommendable 'ITEM' genus includes two species: 'ringtone' and 'wallpaper'. For simplicity, non-recommendable or joining nodes are limited to a single genus, and recommendable nodes are also limited to a single genus. However, more complex graphs contain other genera of non-recommendable nodes such as locations, times-of-day, or devices. Similarly, other graphs may contain other genera of recommendable nodes.

Nodes are depicted as circles. The recommendations directed-graph illustrated in directed graph visualization 600 contains two nodes (UserA and UserB) of the non-recommendable genus 'user' and three nodes ('RTA', 'RTC', and 'WPA') of the recommendable genus 'item'. Nodes 'RTA' and 'RTC' are members of the 'ringtones' species of recommendable items, while node 'WPA' is a member of the 'wallpapers' species of recommendable items.

Edges between the nodes are depicted with arrows and are associated with edge-weight metadata (here, parenthesized integers). In the recommendations directed-graph illustrated in directed graph visualization 600, each edge is paired with a return edge, with the exception of the edge between UserB and the item 'WPA'. Thus, the recommendations directed-graph illustrated in directed graph visualization 600 shows that symmetry in node relationships is not required. Furthermore, the recommendations directed-graph illustrated in directed graph visualization 600 is not undirected. Although many weighted edges are paired with return weighted edges, each edge holds only a reference to its target.

The nodes in the tiny recommendations directed-graph illustrated in directed graph visualization 600 illustrated in directed graph visualization 600 include only one or two weighted edges. However, in practice some nodes in a recommendations directed-graph may have hundreds, thousands, or more weighted edges (which would ordinarily require a great amount of computation to fully process).

As discussed herein, there are many ways to represent a directed graph in a data structure. For example, one naive data-representation of the recommendations directed-graph illustrated in directed graph visualization 600 follows.

```
RTA:
    genus: ITEM
    species: ringtones
    edges:
        target: UserA
        weight: 90
UserA:
    genus: USER
    edges:
        target: RTA
        weight: 90
        target: RTC
        weight: 70
RTB:
    genus: ITEM
    species: ringtones
    edges: [ ]
    do_not_recommend: true
RTC:
    genus: ITEM
    species: ringtones
    edges:
        target: UserA
        weight: 70
        target: UserB
        weight: 80
```

```
            UserB:
               genus: USER
               edges:
                  target: RTC
                  weight: 80
                  target: WPA
                  weight: 50
            WPA:
               genus: ITEM
               species: wallpaper
               edges: [ ]
```

To facilitate human comprehension, this and other example data objects depicted herein are presented according to version 1.2 of the YAML "human friendly data serialization standard", specified at http://www.yaml.org/spec/1.2/spec.html. In practice, data objects may be serialized for storage and/or transmission into any suitable format (e.g., YAML, JSON, XML, BSON, Property Lists, or the like).

While a naive data-representation, such as that shown above, may be suitable for tiny graphs such as recommendations directed-graph illustrated in directed graph visualization 600, naive representations may be unsatisfactory for devices that are required to traverse graphs having thousands of nodes connected by hundreds-of-thousands or millions of weighted edges.

Figure 7:
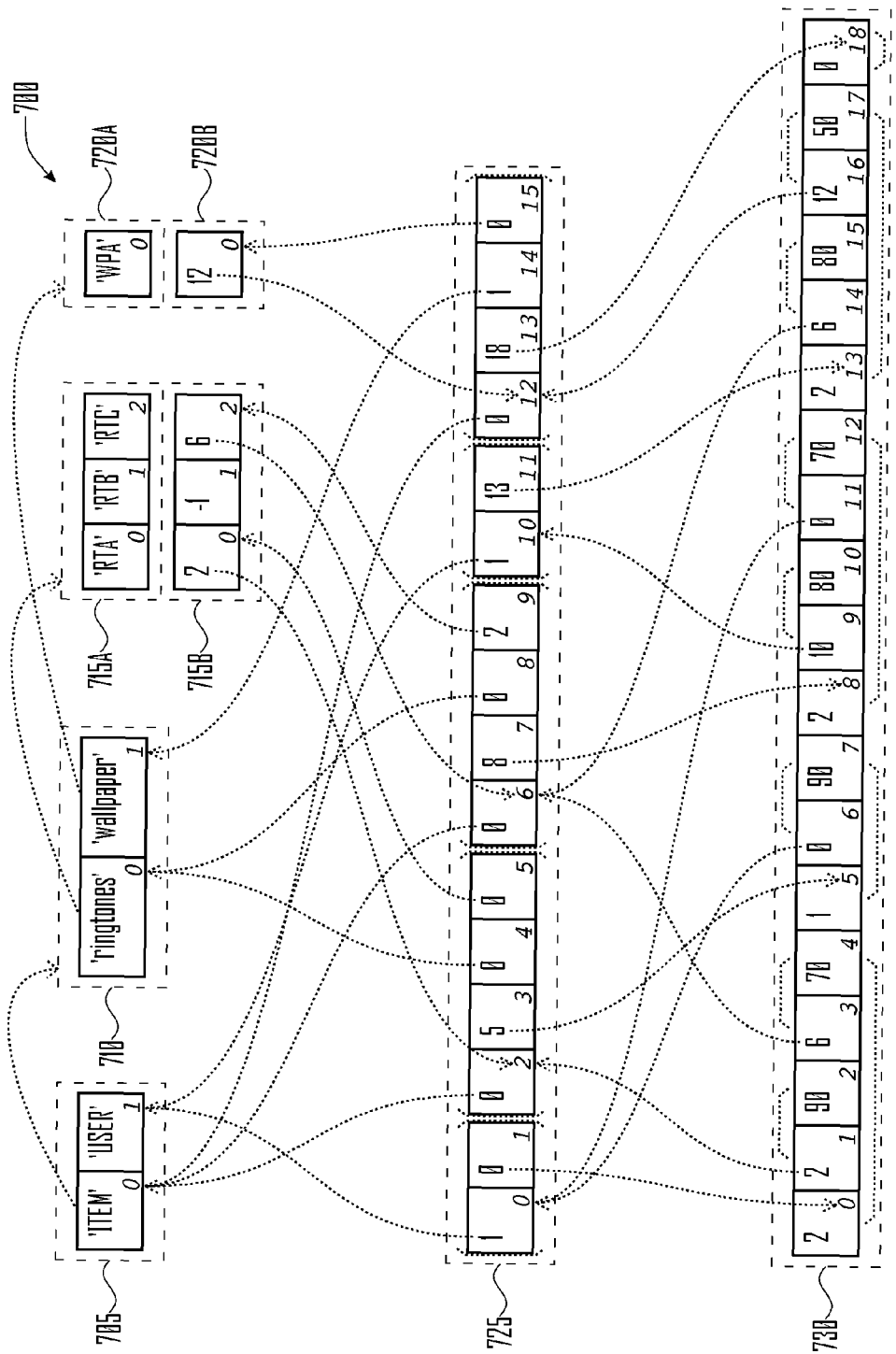
FIG. 7 illustrates a compact-graph-representation visualization of the recommendations directed-graph illustrated in directed graph visualization shown in FIG. 6, in accordance with one embodiment.

FIG. 7 illustrates a compact-graph-representation visualization 700 of the recommendations directed-graph illustrated in directed graph visualization 600 shown in FIG. 6, in accordance with one embodiment. In general, compact-graph-representation visualization 700 depicts various arrays or other referenceable data-structures. Each item in the various arrays is represented in compact-graph-representation visualization 700 as a box, with horizontally adjacent boxes representing adjacent items in an array. The value (an integer or string) of an item is shown in standard type in the upper portion of the box. The index of an item within its array is shown in italic type in the lower-right portion of the box.

Dashed lines enclose members of each array (or group of arrays in the case of indexed ringtone data 715 and indexed wallpaper data 720). Dotted arrows show logical relationships between an item value and another index or array to which that item value logically corresponds.

More specifically, the various arrays depicted in compact-graph-representation visualization 700 include the following.

genera array 705 represents an array (or other referenceable data-structure) of string entries corresponding to various node genera included in recommendations directed-graph illustrated in directed graph visualization 600. In other embodiments, there may be more and/or different genus entries.

species array 710 represents an array (or other referenceable data-structure) of string entries corresponding to various recommendable node species included in recommendations directed-graph illustrated in directed graph visualization 600. In other embodiments, there may be more, fewer, and/or different recommendable node species.

indexed ringtone data 715A-B represent arrays (or other referenceable data-structures) of data related to nodes that are members of the 'ringtones' species of recommendable items included in recommendations directed-graph illustrated in directed graph visualization 600. Each of indexed ringtone data 715A-B is indexed according to a common scheme. In practice, indexed ringtone data 715 arrays generally include hundreds, thousands, or more entries.

indexed wallpaper data 720A-B represent arrays (or other referenceable data-structures) of data related to nodes that are members of the 'wallpapers' species of recommendable items included in recommendations directed-graph illustrated in directed graph visualization 600. Each of indexed wallpaper data 720A-B is indexed according to a common scheme. In practice, indexed wallpaper data 720 arrays generally include hundreds, thousands, or more entries.

nodes array 725 represents an array (or other referenceable data-structure) of integer entries that correspond to various aspects of the nodes included in recommendations directed-graph illustrated in directed graph visualization 600. Logical groups of entries within nodes array 725 are indicated visually with a small amount of horizontal white space and dotted brackets between adjacent boxes.

edges array 730 represents an array (or other referenceable data-structure) of integer entries that correspond to various aspects of the edges included in recommendations directed-graph illustrated in directed graph visualization 600. Logical groups of edge-data entries within edges array 730 are indicated visually by dotted under-brackets in compact-graph-representation visualization 700.

Not shown in FIG. 7 are additional maps or similar data structures that map ringtone and wallpaper item identifiers to indices of indexed ringtone data 715A-B and indexed wallpaper data 720A-B, respectively. For example, in one embodiment, such a map mapping ringtone-item identifiers to indexed ringtone data 715A-B indices might be represented (in YAML) as follows.

RTA: 0
RTB: 1
RTC: 2

In one embodiment, indexed ringtone data 715B and indexed wallpaper data 720B may be part of a multi-level map keyed to genus and species identifiers. For example, in one embodiment, indexed ringtone data 715B and indexed wallpaper data 720B may be included in a single data structure similar to that shown in the following YAML representation.

```
            ITEM:
               wallpaper: [12]
               ringtones: [2, -1, 6]
```

As mentioned above, logical groups of entries within nodes array 725 are set off with a small amount of horizontal white space between adjacent boxes. More specifically, in nodes array 725:

the entries at indices [0-1] are part of a logical group corresponding to the user-genus node UserA the entries at indices [2-5] correspond to ringtone-genus node 'RTA' the entries at indices [6-9] correspond to ringtone-genus node 'RTC' the entries at indices [10-11] correspond to user-genus node UserB the entries at indices [12-15] correspond to wallpaper-genus node 'WPA'

Within each logical group, the value at the first position is a reference to a position in genera array 705 (indicating a node's genus); and the value at the second position is a reference to a position in edges array 730 (indicating a node's edge data). For logical groups corresponding to a user-genus (non-recommendable) node, there are only two positions. For logical groups corresponding to an item-genus (recommendable) node, there are two additional positions, which refer respectively to a position in species array 710 (indicating a node's species) and to a position indexed data corresponding to that species (e.g., indexed ringtone data 715A-B for ringtone-species nodes, or indexed wallpaper data 720A-B for wallpaper-species nodes).

As mentioned above, logical groups of edge-data entries within edges array 730 are indicated visually with dotted under-brackets. More specifically, in edges array 730:

the entries at indices [0-4] make up a logical group of edge-data corresponding to the user-genus node UserA the entries at indices [5-7] make up edge-data corresponding to ringtone-genus node 'RTA' the entries at indices [8-12] make up edge-data corresponding to ringtone-genus node 'RTC' the entries at indices [13-17] make up edge-data corresponding to user-genus node UserB the entry at index [18] makes up edge-data corresponding to wallpaper-genus node 'WPA'

Within any given logical group, the value at the first position indicates how many (zero or more) subsequent pairs of values belong to that logical group. Within each subsequent pair, the value at the first position is a reference to a position in nodes array 725 (indicating a target node of an edge), and the value at the second position is an edge-metadata value (indicating a weight of an edge). Such pairs of entries are indicated visually by dotted over-brackets in compact-graph-representation visualization 700.

In many embodiments, the number of edges in a production graph is typically significantly greater than the number of nodes in that graph. Storing such graphs using integer arrays in a compact representation such as that depicted in FIG. 7 may allow even very large graphs to be stored in reasonable amounts of primary memory on a server.

For example, assuming that on a given platform, an integer can have a maximum value of $2^{31}-1$, assuming an average of 12 edges per node, and assuming a 30:1 ratio of non-recommendable nodes to recommendable nodes, a compact graph-representation similar to that shown in FIG. 7 can store over 1 billion nodes and over 12 billion edges in less than 128 GB of RAM.

Although the above-described example is implemented using integer-indexed one-dimensional arrays or lists, in other embodiments, similar systems and methods may be implemented using multi-dimensional arrays and/or referenceable data-structures other than integer-indexed arrays or lists, such as hash tables, hash maps, associative arrays, symbol tables, dictionaries, in-memory databases or the like.

Figure 8:
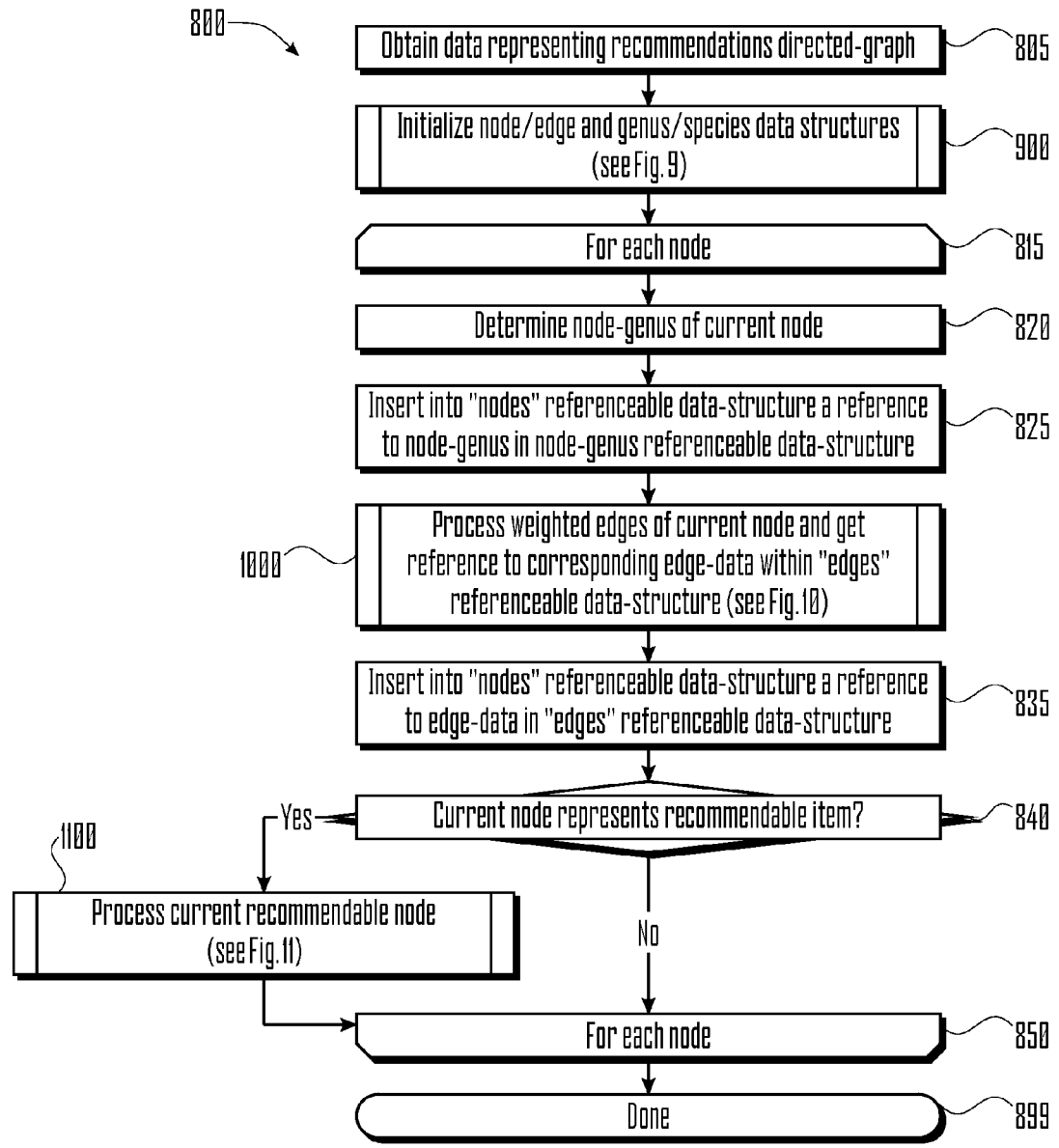
FIG. 8 illustrates a graph-compacting routine for generating a compact representation of a recommendations directed-graph, such as may be performed by a recommendations server in accordance with one embodiment.

FIG. 8 illustrates a graph-compacting routine 800 for generating a compact representation of a recommendations directed-graph, such as may be performed by a recommendations server 1200 in accordance with one embodiment.

In block 805, graph-compacting routine 800 obtains data representing a recommendations directed-graph. For example, in one embodiment, graph-compacting routine 800 may obtain data (such as the naive data-representation shown above) representing the recommendations directed-graph illustrated in directed graph visualization 600 (see FIG. 6, discussed above).

In subroutine block 900, graph-compacting routine 800 calls subroutine 900 (see FIG. 9, discussed below) to initialize a plurality of node/edge and genus/species data structures. For example, in one embodiment, subroutine 900 may initialize data structures such as nodes array 725, edges array 730, genera array 705, species array 710, indexed ringtone data 715A-B, and indexed wallpaper data 720A-B (see FIG. 7, discussed above).

Beginning in opening loop block 815, graph-compacting routine 800 processes each node in the recommendations directed-graph obtained in block 805.

In block 820, graph-compacting routine 800 determines a node-genus of the current node. For example, when processing a given node from the recommendations directed-graph illustrated in directed graph visualization 600, graph-compacting routine 800 may determine that the given node is of the genus ITEM or USER, which may be respectively referred to within genera array 705 by the indices 0 and 1.

In block 825, graph-compacting routine 800 inserts into the "nodes" referenceable data-structure a reference to the determined node-genus in the node-genus referenceable data-structure initialized in initialization subroutine 900. For example, when processing a given node from the recommendations directed-graph illustrated in directed graph visualization 600, graph-compacting routine 800 may insert into nodes array 725 an index referring within genera array 705 to the genus determined in block 820.

In subroutine block 1000, graph-compacting routine 800 calls subroutine 1000 (see FIG. 10, discussed below) to process any weighted edges of the current node and get a reference to any corresponding edge-data within the "edges" referenceable data-structure. For example, when processing a given node from the recommendations directed-graph illustrated in directed graph visualization 600, graph-compacting routine 800 may get an index referring within edges array 730 to the first entry of a logical group of entries that define outbound weighted edges from the current node.

In block 835, graph-compacting routine 800 inserts into the "nodes" referenceable data-structure a reference to edge-data in the "edges" referenceable data-structure. For example, when processing a given node from the recommendations directed-graph illustrated in directed graph visualization 600, graph-compacting routine 800 may insert into nodes array 725 the index obtained in subroutine block 1000, which refers to an entry within edges array 730.

In decision block 840, graph-compacting routine 800 determines whether the current node represents a recommendable item. For example, when processing a given node from the recommendations directed-graph illustrated in directed graph visualization 600, graph-compacting routine 800 may determine whether the current node is of the ITEM genus.

If so, graph-compacting routine 800 proceeds to recommendable-node processing subroutine 1100. Otherwise, if the current node represents a non-recommendable item, graph-compacting routine 800 proceeds to ending loop block 850.

In subroutine block 1100, graph-compacting routine 800 calls subroutine 1100 (see FIG. 11, discussed below) to process the current recommendable node.

In ending loop block 850, graph-compacting routine 800 iterates back to opening loop block 815 to process the next node, if any.

Graph-compacting routine 800 ends in ending block 899.

Figure 9:
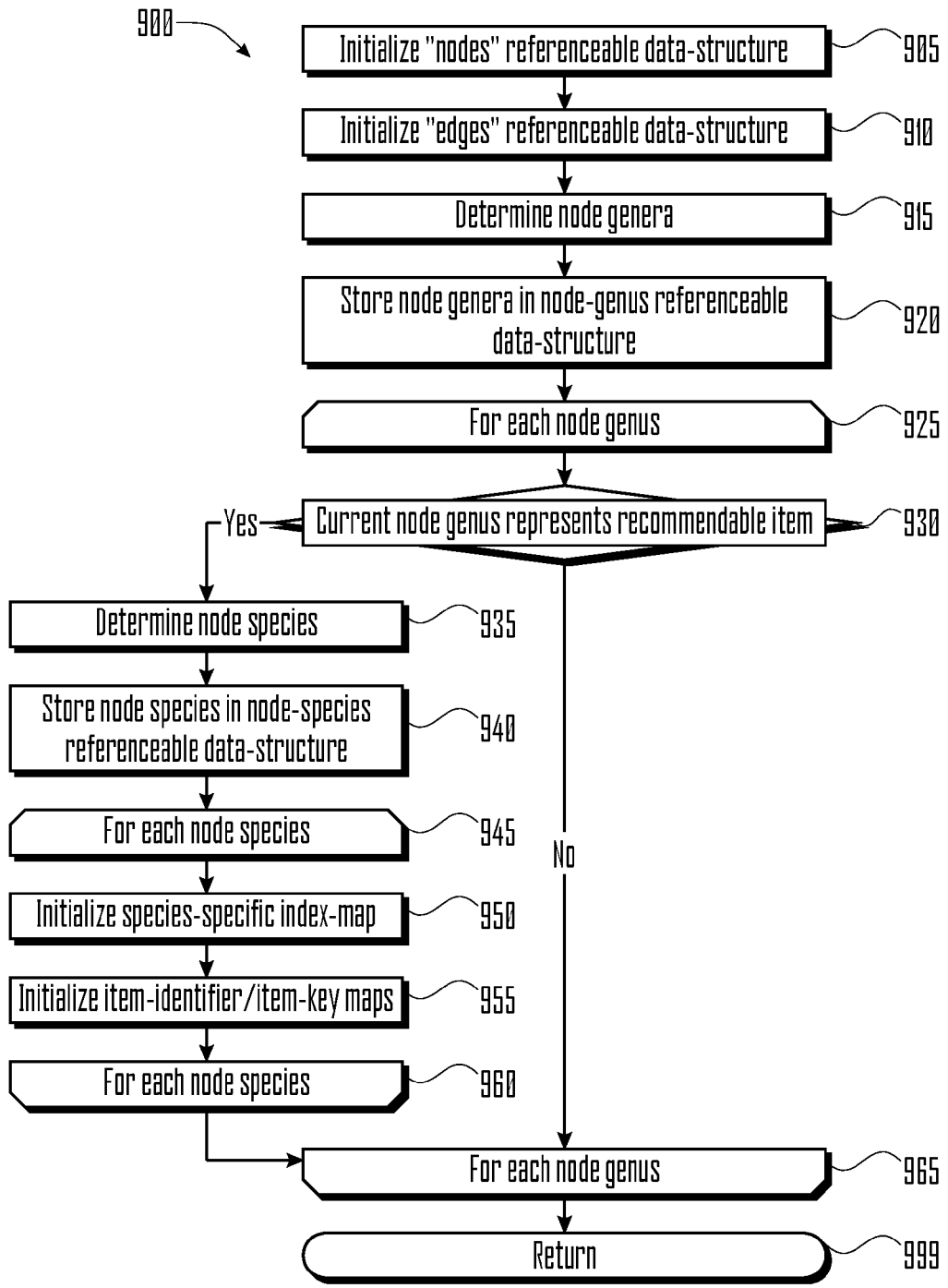
FIG. 9 illustrates an initialization subroutine for initializing data structures to generate a compact representation of a recommendations directed-graph, such as may be performed by a recommendations server in accordance with one embodiment.

FIG. 9 illustrates an initialization subroutine 900 for initializing data structures to generate a compact representation of a recommendations directed-graph, such as may be performed by a recommendations server 1200 in accordance with one embodiment.

In block 905, initialization subroutine 900 initializes a "nodes" referenceable data-structure. For example, when processing the recommendations directed-graph illustrated in directed graph visualization 600, initialization subroutine 900 may initialize nodes array 725.

In block 910, initialization subroutine 900 initializes an "edges" referenceable data-structure. For example, when processing the recommendations directed-graph illustrated in directed graph visualization 600, initialization subroutine 900 may initialize edges array 730.

In block 915, initialization subroutine 900 determines a plurality of node genera. For example, when processing the recommendations directed-graph illustrated in directed graph visualization 600, initialization subroutine 900 may determine that the recommendations directed-graph includes nodes belonging to the genus ITEM and the genus USER.

In block 920, initialization subroutine 900 stores the plurality of node genera in a node-genus referenceable data-structure. For example, when processing the recommendations directed-graph illustrated in directed graph visualization 600, initialization subroutine 900 may store the genera determined in block 915 in genera array 705.

Beginning in opening loop block 925, initialization subroutine 900 processes each node genus in turn.

In decision block 930, initialization subroutine 900 determines whether the current node genus represents a recommendable item. For example, when processing a given node from the recommendations directed-graph illustrated in directed graph visualization 600, initialization subroutine 900 may determine whether the current node genus is of the ITEM genus (recommendable item) or the USER genus (non-recommendable item).

If the current node genus represents a recommendable item, initialization subroutine 900 proceeds to block 935. Otherwise, if the current node genus represents a non-recommendable item, initialization subroutine 900 proceeds to ending loop block 965.

In block 935, initialization subroutine 900 determines a plurality of node species to which recommendable item-nodes within the recommendations directed-graph belong. For example, when processing the recommendations directed-graph illustrated in directed graph visualization 600, initialization subroutine 900 may determine that the recommendations directed-graph includes recommendable item-nodes belonging to the species 'ringtones' and the species 'wallpaper'.

In block 940, initialization subroutine 900 stores the plurality of node species in a node-species referenceable data-structure. For example, when processing the recommendations directed-graph illustrated in directed graph visualization 600, initialization subroutine 900 may store the species determined in block 935 in species array 710.

Beginning in opening loop block 945, initialization subroutine 900 processes each node species in turn.

In block 950, initialization subroutine 900 initializes a species-specific index-map for the current node species. For example, when processing the species 'ringtones' of the recommendations directed-graph illustrated in directed graph visualization 600, initialization subroutine 900 may initialize indexed ringtone data 715B.

In block 955, initialization subroutine 900 initializes an item-identifier→item-key map and an item-key→item-identifier map for the current node species. For example, when processing the species 'ringtones' of the recommendations directed-graph illustrated in directed graph visualization 600, initialization subroutine 900 may initialize indexed ringtone data 715A (item-key→item-identifier map), from which it is possible to obtain an item-identifier given an item key; and a corresponding data structure (not shown in FIG. 6) from which it is possible to obtain an item key given an item-identifier.

For example, indexed ringtone data 715A is an array storing item identifiers ('RTA', 'RTB', and 'RTC') that can be accessed using the item keys (indices) 0, 1, and 2, respectively. A corresponding item-identifier→item-key map might be structured as follows.

RTA: 0
RTB: 1
RTC: 2

In some embodiments, a corresponding item-identifier→item-key map may contain additional data corresponding to a recommendable item, such as shown in the following.

---

RTA:
    item_key: 0
    name: Baby Baby Baby
    artist: Larry and the Forgotten Beef
    rating: G
RTB:
    item_key: 1
    name: Keep doing that thing
    artist: Donna Beach Sextet
    rating: X
RTC:
    item_key: 2
    name: Honeysuckle Rose
    artist: Death Tongue
    rating: PG

---

In ending loop block 960, initialization subroutine 900 iterates back to opening loop block 945 to process the next node species, if any.

In ending loop block 965, initialization subroutine 900 iterates back to opening loop block 925 to process the next node genus, if any.

Once all node species and genera have been processed, initialization subroutine 900 ends in ending block 999, returning to the caller.

Figure 10:
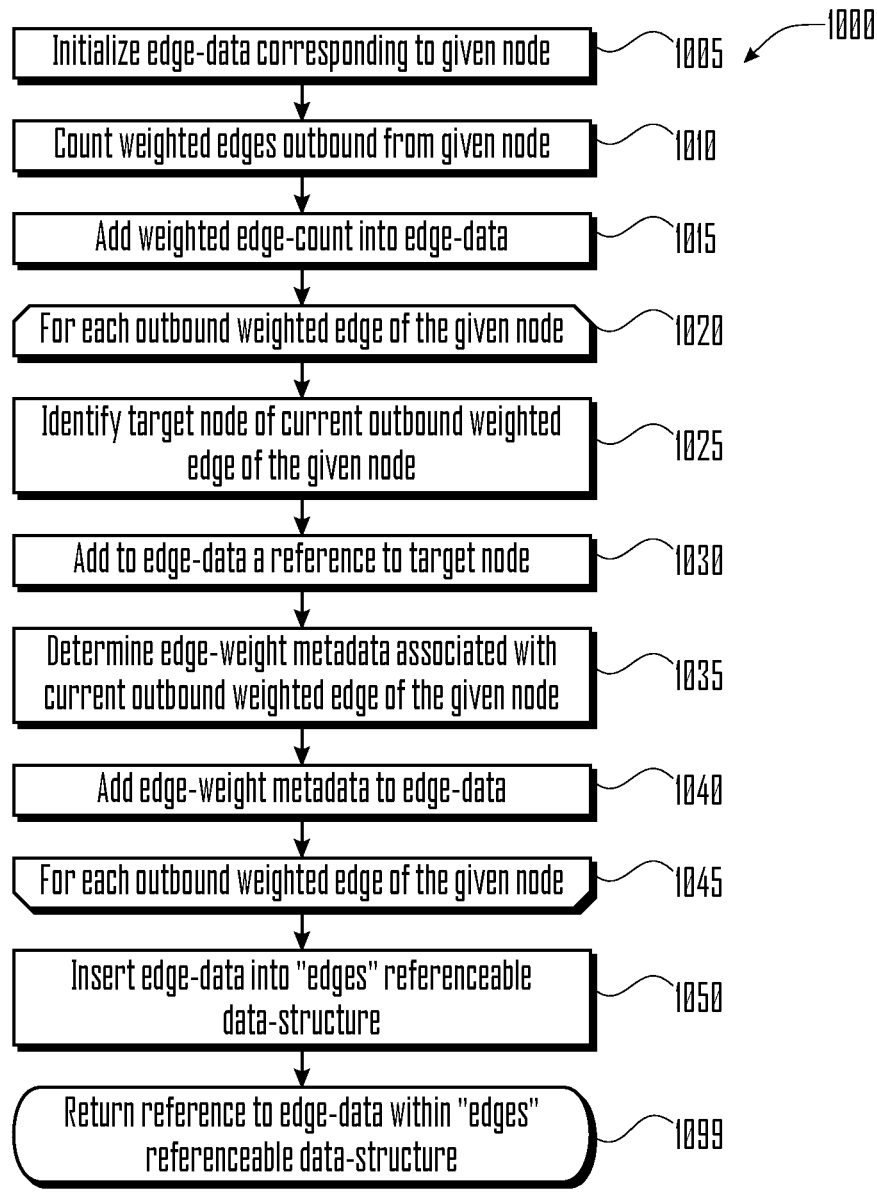
FIG. 10 illustrates an edges-processing subroutine for processing weighted edges of a given node to generate a compact graph representation of a recommendations directed-graph, such as may be performed by a recommendations server in accordance with one embodiment.

FIG. 10 illustrates an edges-processing subroutine 1000 for processing weighted edges of a given node to generate a compact graph representation of a recommendations directed-graph, such as may be performed by a recommendations server 1200 in accordance with one embodiment.

In block 1005, edges-processing subroutine 1000 initializes edge-data corresponding to the given node. For purposes of this description, such edge-data refers to a logical group of array entries (or similar), such as the logical groups discussed above in reference to edges array 730 (see FIG. 7, discussed above). Although edges-processing subroutine 1000 is described in terms of building an edge-data structure, then inserting that structure into an "edges" referenceable data-structure, in other embodiments, edges-processing subroutine 1000 may equivalently simply insert entries directly into the "edges" referenceable data-structure.

In block 1010, edges-processing subroutine 1000 determines a count of zero or more weighted edges outbound from the given node.

In block 1015, edges-processing subroutine 1000 adds into the edge-data initialized in block 1005 the weighted edge-count determined in block 1010.

Beginning in opening loop block 1020, edges-processing subroutine 1000 processes each outbound weighted edge of the given node in turn.

In block 1025, edges-processing subroutine 1000 identifies the target node of the current outbound weighted edge of the given node.

In block 1030, edges-processing subroutine 1000 adds to the edge-data a reference to the identified target node within a "nodes" referenceable data-structure. For example, when processing the outbound weighted edge from node UserB targeting item 'WPA' in the recommendations directed-graph illustrated in directed graph visualization 600, edges-processing subroutine 1000 may add to the edge-data an index (12) that refers to a logical group of entries in nodes array 725 that corresponds to the node 'WPA'.

In block 1035, edges-processing subroutine 1000 determines edge-weight metadata associated with the current outbound weighted edge of the given node.

In block 1040, edges-processing subroutine 1000 adds edge-weight metadata to edge-data.

In ending loop block 1045, edges-processing subroutine 1000 iterates back to opening loop block 1020 to process the next outbound weighted edge of the given node, if any.

In block 1050, edges-processing subroutine 1000 inserts the edge-data into the "edges" referenceable data-structure. For example, when processing the node UserB in the recommendations directed-graph illustrated in directed graph visualization 600, after the operations described above, the edge-data may include a logical group of entries, [2, 6, 80, 6, 50], as follows:

2 (count of outbound edges)
6 (reference to a logical group of node entries in nodes array 725 that correspond to item 'RTC')
80 (edge weight value)
6 (reference to a logical group of node entries in nodes array 725 that correspond to item 'WPA')
50 (edge weight value)

In block 1050, edges-processing subroutine 1000 inserts that group of entries into edges array 730 at indices 13-17.

In ending block 1099, edges-processing subroutine 1000 returns a reference to the edge-data described above within the "edges" referenceable data-structure. For example, when processing the node UserB in the recommendations directed-graph illustrated in directed graph visualization 600, edges-processing subroutine 1000 returns the index 13, which acts as a reference to this edge-data within edges array 730.

Figure 11:
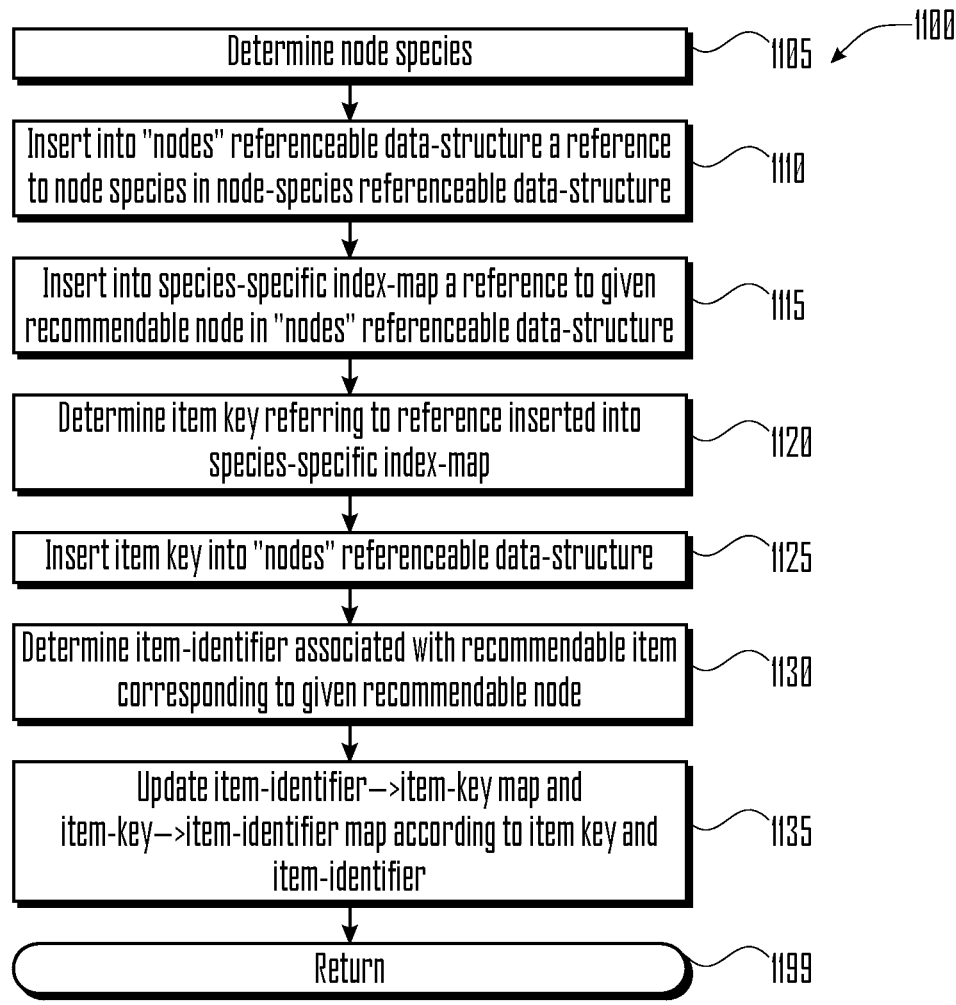
FIG. 11 illustrates a recommendable-node processing subroutine for processing a given recommendable node, such as may be performed by a recommendations server in accordance with one embodiment.

FIG. 11 illustrates a recommendable-node processing subroutine 1100 for processing a given recommendable node, such as may be performed by a recommendations server 1200 in accordance with one embodiment.

In block 1105, recommendable-node processing subroutine 1100 determines a node species of the given recommendable node. For example, when processing the node 'RTA' in the recommendations directed-graph illustrated in directed graph visualization 600, recommendable-node processing subroutine 1100 may determine that it is a member of the 'ringtones' species, which may be referred to within species array 710 by the index 0.

In block 1110, recommendable-node processing subroutine 1100 inserts into a "nodes" referenceable data-structure a reference to the determined node species in a node-species referenceable data-structure. For example, when processing the node 'RTA' in the recommendations directed-graph illustrated in directed graph visualization 600, recommendable-node processing subroutine 1100 may insert into nodes array 725 (at position 4) a reference (the index 0) to the 'ringtones' entry within species array 710. In block 1115, recommendable-node processing subroutine 1100 inserts into the species-specific index-map a reference to the given recommendable node in the "nodes" referenceable data-structure. For example, when processing the node 'RTA' in the recommendations directed-graph illustrated in directed graph visualization 600, recommendable-node processing subroutine 1100 may insert into indexed ringtone data 715B (at position 0) a reference (the index 2) that refers to a logical group of entries within nodes array 725 that correspond to the node 'RTA'.

As discussed above, one or more additional referenceable data-structures (e.g., indexed ringtone data 715A) share a common indexing scheme with indexed ringtone data 715B. Thus, the index 0 is referred to as an item key for the node 'RTA', as the index 0 can be used to identify an item identifier for the node (from indexed ringtone data 715A), as well as to identify a reference (the index 2, identified from indexed ringtone data 715B) to a logical group of entries within nodes array 725.

In block 1120, recommendable-node processing subroutine 1100 determines an item key referring to the reference inserted into the species-specific index-map in block 1115. For example, when processing the node 'RTA' in the recommendations directed-graph illustrated in directed graph visualization 600, recommendable-node processing subroutine 1100 may determine that the index 0 is an item key that refers to an entry within indexed ringtone data 715B, which entry refers to a logical group of entries within nodes array 725 that correspond to the node 'RTA'.

In block 1125, recommendable-node processing subroutine 1100 inserts the item key into "nodes" referenceable data-structure in block 1120. For example, when processing the node 'RTA' in the recommendations directed-graph illustrated in directed graph visualization 600, recommendable-node processing subroutine 1100 may insert (at position 5) into nodes array 725 the item key determined in block 1120 (the index 0).

In block 1130, recommendable-node processing subroutine 1100 determines an item-identifier associated with recommendable item corresponding to the given recommendable node. For example, when processing the node 'RTA' in the recommendations directed-graph illustrated in directed graph visualization 600, recommendable-node processing subroutine 1100 may determine that the string 'RTA' identifies the item to which the node corresponds, this identifier being used to locate and/or query additional information about the item.

In block 1135, recommendable-node processing subroutine 1100 updates the appropriate item-identifier→item-key map and item-key→item-identifier map according to the item key determined in block 1120 and the item-identifier determined in block 1130. For example, when processing the node 'RTA' in the recommendations directed-graph illustrated in directed graph visualization 600, recommendable-node processing subroutine 1100 may insert the identifier 'RTA' into an item-key→item-identifier map, such as indexed ringtone data 715A, at position 0 (the item key corresponding to the node), such that the item-identifier (the string 'RTA') may be located given the item key.

Similarly, when processing the node 'RTA' in the recommendations directed-graph illustrated in directed graph visualization 600, recommendable-node processing subroutine 1100 may insert an entry (such as RTA: 0) into an item-identifier→item-key map, such as described in reference to block 1030 (see FIG. 10, discussed above). Using such an item-identifier→item-key map, the item key may be located given the item-identifier.

Recommendable-node processing subroutine 1100 ends in ending block 1199, returning to the caller.

Figure 12:
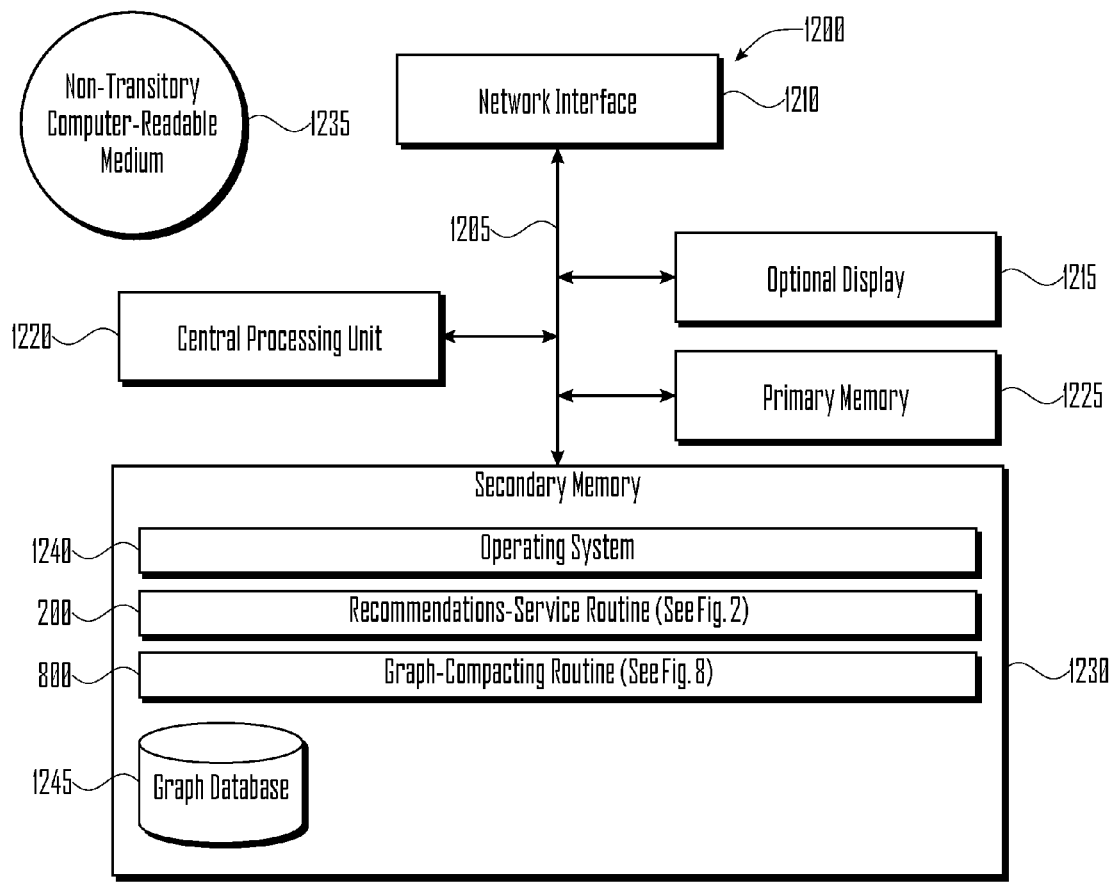
FIG. 12 illustrates several components of an exemplary recommendations server in accordance with one embodiment.

FIG. 12 illustrates several components of an exemplary recommendations server in accordance with one embodiment. In some embodiments, recommendations server 1200 may include many more components than those shown in FIG. 12. However, it is not necessary that all of these generally conventional components be shown in order to disclose an illustrative embodiment.

In various embodiments, recommendations server 1200 may comprise one or more physical and/or logical devices that collectively provide the functionalities described herein. In some embodiments, recommendations server 1200 may comprise one or more replicated and/or distributed physical or logical devices.

In some embodiments, recommendations server 1200 may comprise one or more computing resources provisioned from a public "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like or from a private "cloud computing" platform set up on premise or a hybrid of both.

Recommendations server 1200 includes a bus 1205 interconnecting several components including a network interface 1210, an optional display 1215, a central processing unit 1220, a primary memory 1225, and a secondary memory 1230.

Primary memory 1225 generally comprises a random access memory ("RAM"). Primary memory 1225 is also sometimes referred to as main memory or internal memory and may include one or more levels of cache memory. Primary memory 1225 differs from secondary memory 1230 and other forms of accessible storage in that primary memory 1225 is directly accessible to the central processing unit 1220, which continuously reads instructions stored in primary memory 1225 and executes those instructions as required. Any data that the central processing unit 1220 is actively operating on is also stored in primary memory 1225.

Secondary memory 1230 generally comprises a permanent non-transitory mass storage device, such as a hard disk drive or solid-state drive. The secondary memory 1230 stores program code for a recommendations-service routine 200 for providing a recommendations service (see FIG. 2, discussed above) and a graph-compacting routine 800 for generating a compact representation of a recommendations directed-graph (see FIG. 8, discussed above). In addition, the secondary memory 1230 also stores an operating system 1240

These and other software components may be loaded into secondary memory 1230 of recommendations server 1200 using a drive mechanism (not shown) associated with a non-transitory computer-readable medium 1235, such as a floppy disc, tape, DVD/CD-ROM drive, memory card, or the like.

Secondary memory 1230 also includes graph database 1245. In some embodiments, recommendations server 1200 may communicate with graph database 1245 via network interface 1210, a storage area network ("SAN"), a high-speed serial bus, and/or via the other suitable communication technology.

In some embodiments, graph database 1245 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although the various recommendations directed-graphs described above are structured such that one joining node (representing a non-recommendable item) separates recommendable nodes (representing recommendable items), in other embodiments, there may be two or more joining nodes between recommendable nodes or no joining nodes where recommendable items are connected directly. For example, in alternate embodiments, a recommendations directed-graph may have joining nodes representing users and shopping carts, users and locations, users and dates/times, or the like. This application is intended to cover any adaptations or variations of the embodiments discussed herein.

The invention claimed is:

1. A recommendations-device-implemented method for providing recommendations, the method comprising:
 obtaining, by a recommendations device, a compact graph representation representing a recommendations graph, wherein said recommendations graph comprises a multiplicity of nodes and a multiplicity of weighted edges, each node of said multiplicity of nodes being associated with type metadata indicating that each node represents one of a multiplicity of recommendable items or one of a multiplicity of non-recommendable items, each weighted edge of said multiplicity of weighted edges joining a source node of said multiplicity of nodes to a target node of said multiplicity of nodes, each weighted edge being associated with edge-weight metadata, wherein said compact graph representation includes a genera integer array representing all of a multiplicity of node genera included in the recommendations graph, a species integer array representing all of a multiplicity of recommendable node species included in the recommendations graph, or a combination thereof, and wherein said compact graph representation further includes a nodes integer array representing all of said multiplicity of nodes and an edges integer array representing all of said multiplicity of weighted edges of said recommendations graph;
 storing said compact graph representation in a primary memory of said recommendations device;
 receiving, by said recommendations device, a multiplicity of recommendation requests, each request requesting a recommendation of at least one recommendable item for a remote user based at least in part on request-context metadata associated with each request;
 processing, by said recommendations device, each request of said multiplicity of recommendation requests, including performing at least the following steps for each request:
  selecting an entry node of said multiplicity of nodes based at least in part on said request-context metadata;
  traversing, via said compact graph representation in said primary memory, only a highly-weighted portion of said recommendations graph that is proximate to said entry node to select a multiplicity of paths leading respectively to a multiplicity of potential recommendation nodes, each of which represents a recommendable item of said multiplicity of recommendable items, said multiplicity of paths being selected based at least in part on weighted-edge-weights of weighted edges making up a given path;

computing a multiplicity of cumulative node scores corresponding respectively to said multiplicity of potential recommendation nodes, including computing each cumulative node score based at least in part on said weighted-edge-weights of each path of said multiplicity of paths that lead to a given node;

selecting a recommendation node based at least in part on said multiplicity of cumulative node scores; and providing in response to each request an identifier identifying a recommendable item represented by said selected recommendation node.

2. The method of claim 1, wherein obtaining said compact graph representation comprises:

initializing the nodes integer array and the edges integer array;

iterating over each node of said multiplicity of nodes, including performing at least the following steps for each node:

determining edge data comprising an edge-count of zero or more outbound weighted edges and for each of said zero or more outbound weighted edges, an edge-weight-related value and a target-node reference referencing data within said nodes integer array;

inserting said edge data into said edges integer array;

determining node data comprising an item-type reference referencing an item-type associated with each node and an edges-data reference referencing said edge data within said edges integer array; and inserting said node data into said nodes integer array.

3. The method of claim 2, wherein for each node that represents a recommendable item, said node data further comprises a recommendable-item-type reference referencing a species of recommendable-item.

4. The method of claim 3, wherein iterating over each node includes further performing at least the following steps for each node that represents a recommendable item:

inserting, into the species integer array corresponding to said species of recommendable-item, a node-data reference to said node data within said nodes integer array.

5. The method of claim 4, wherein for each node that represents a recommendable item:

said node data further comprises a reference to said node-data reference within said species integer array.

6. The method of claim 1, wherein traversing only a highly-weighted portion of said recommendations graph that is proximate to said entry node comprises:

determining a batch count ("N") and a depth limit; and from any given node:

ordering outbound weighted edges according to said edge-weight metadata associated therewith; and following only a top "N" outbound weighted edges, as ordered, and only when a length of a path from said entry node to any given node is less than said depth limit.

7. The method of claim 1, wherein computing each cumulative node score comprises decaying said weighted-edge-weights of each path of said multiplicity of paths based at least in part on a given weighted edge's distance from said entry node.

8. The method of claim 1, wherein said edge-weight metadata, with which each weighted edge is associated, comprises a date and/or time value and a base weight value, and wherein computing each cumulative node score comprises, for each weighted edge of each path of said multiplicity of paths that leads to said given node, decaying said base weight value according to said date and/or time value for each weighted edge.

9. The method of claim 2, further comprising:

inserting, into said nodes integer array, an edge-data reference to said edge data within said edges integer array.

10. The method of claim 1, wherein said compact graph representation further includes indexed digital media data representing integer arrays of data related to all of the multiplicity of recommendable node species, and wherein said compact graph representation is storable in a primary memory of said recommendations device, and wherein the recommendations graph is stored in a secondary memory of said recommendation device, and wherein said primary memory is directly accessible by a central processing unit of said recommendation device, and wherein said secondary memory is a mass storage memory accessible by said recommendation device.

11. A computing apparatus for providing recommendations, the apparatus comprising a processor and a memory storing instructions that, when executed by the processor, cause the computing apparatus to:

obtain a compact graph representation representing a recommendations graph, wherein said recommendations graph comprises a multiplicity of nodes and a multiplicity of weighted edges, each node of said multiplicity of nodes being associated with type metadata indicating that each node represents one of a multiplicity of recommendable items or one of a multiplicity of non-recommendable items, each weighted edge of said multiplicity of weighted edges joining a source node of said multiplicity of nodes to a target node of said multiplicity of nodes, each weighted edge being associated with edge-weight metadata, wherein said compact graph representation includes a genera integer array representing all of a multiplicity of node genera included in the recommendations graph, a species integer array representing all of a multiplicity of recommendable node species included in the recommendations graph, or a combination thereof, and wherein said compact graph representation includes a nodes integer array representing all of said multiplicity of nodes and an edges integer array representing all of said multiplicity of weighted edges of said recommendations graph;

store said compact graph representation in a primary memory of the computing apparatus;

receive a multiplicity of recommendation requests, each request requesting a recommendation of at least one recommendable item for a remote user based at least in part on request-context metadata associated with each request;

process each request of said multiplicity of recommendation requests, including performing at least the following steps for each request:

selecting an entry node of said multiplicity of nodes based at least in part on said request-context metadata;

traversing, via said compact graph representation in said primary memory, only a highly-weighted portion of said recommendations-graph that is proximate to said entry node to select a multiplicity of paths leading respectively to a multiplicity of potential recommendation nodes, each of which represents a recommendable item of said multiplicity of recommendable items, said multiplicity of paths being selected based at least in part on weighted-edge-weights of weighted edges making up a given path;

computing a multiplicity of cumulative node scores corresponding respectively to said multiplicity of potential recommendation nodes, including computing each cumulative node score based at least in part on said weighted-edge-weights of each path of said multiplicity of paths that lead to a given node;

selecting a recommendation node based at least in part on said multiplicity of cumulative node scores; and providing in response to each request an identifier identifying a recommendable item represented by said selected recommendation node.

12. The apparatus of claim 11, wherein the instructions that configure the apparatus to obtain said compact graph representation further comprise instructions causing the apparatus to:

initialize the nodes integer array and the edges integer array;

iterate over each node of said multiplicity of nodes, including performing at least the following steps for each node:

determining edge data comprising an edge-count of zero or more outbound weighted edges and for each of said zero or more outbound weighted edges, an edge-weight-related value and a target-node reference referencing data within said nodes integer array;

inserting said edge data into said edges integer array;

determining node data comprising an item-type reference referencing an item-type associated with each node and an edges-data reference referencing said edge data within said edges integer array; and inserting said node data into said nodes integer array.

13. The apparatus of claim 12, wherein for each node that represents a recommendable item, said node data further comprises a recommendable-item-type reference referencing a species of recommendable-item.

14. The apparatus of claim 13, wherein iterating over each node includes further performing at least the following steps for each node that represents a recommendable item:

inserting, into the species integer array corresponding to said species of recommendable-item, a node-data reference to said node data within said nodes integer array.

15. The apparatus of claim 14, wherein for each node that represents a recommendable item:

said node data further comprises a reference to said node-data reference within said species integer array.

16. The apparatus of claim 11, wherein the instructions that cause the apparatus to traverse only a highly-weighted portion of said recommendations graph that is proximate to said entry node further comprise instructions causing the apparatus to:

determine a batch count ("N") and a depth limit; and from any given node:

order outbound weighted edges according to said edge-weight metadata associated therewith; and follow only a top "N" outbound weighted edges, as ordered, and only when a length of a path from said entry node to any given node is less than said depth limit.

17. A non-transitory computer-readable storage medium having stored thereon instructions that, when executed by a processor, configure the processor to:

obtain a compact graph representation representing a recommendations graph, wherein said recommendations graph comprises a multiplicity of nodes and a multiplicity of weighted edges, each node of said multiplicity of nodes being associated with type metadata indicating that each node represents one of a multiplicity of recommendable items or one of a multiplicity of non-recommendable items, each weighted edge of said multiplicity of weighted edges joining a source node of said multiplicity of nodes to a target node of said multiplicity of nodes, each weighted edge being associated with edge-weight metadata, wherein said compact graph representation includes a genera integer array representing all of a multiplicity of node genera included in the recommendations graph, a species integer array representing all of a multiplicity of recommendable node species included in the recommendations graph, or a combination thereof, and wherein said compact graph representation includes a nodes integer array representing all of said multiplicity of nodes and an edges integer array representing all of said multiplicity of weighted edges of said recommendations graph;

store said compact graph representation in a primary memory of the processor;

receive a multiplicity of recommendation requests, each request requesting a recommendation of at least one recommendable item for a remote user based at least in part on request-context metadata associated with each request;

process each request of said multiplicity of recommendation requests, including performing at least the following steps for each request:

selecting an entry node of said multiplicity of nodes based at least in part on said request-context metadata;

traversing, via said compact graph representation in said primary memory, only a highly-weighted portion of said recommendations graph that is proximate to said entry node to select a multiplicity of paths leading respectively to a multiplicity of potential recommendation nodes, each of which represents a recommendable item of said multiplicity of recommendable items, said multiplicity of paths being selected based at least in part on weighted-edge-weights of weighted edges making up a given path;

computing a multiplicity of cumulative node scores corresponding respectively to said multiplicity of potential recommendation nodes, including computing each cumulative node score based at least in part on said weighted-edge-weights of each path of said multiplicity of paths that lead to a given node;

selecting a recommendation node based at least in part on said multiplicity of cumulative node scores; and providing in response to each request an identifier identifying a recommendable item represented by said selected recommendation node.

18. The non-transitory computer-readable storage medium of claim 17, wherein the instructions that configure the processor to obtain said compact graph representation further comprise instructions configuring the processor to:

initialize the nodes integer array and the edges integer array;

iterate over each node of said multiplicity of nodes, including performing at least the following steps for each node:

determining edge data comprising an edge-count of zero or more outbound weighted edges and for each of said zero or more outbound weighted edges, an edge-weight-related value and a target-node reference referencing data within said nodes integer array;

inserting said edge data into said edges integer array;

determining node data comprising an item-type reference referencing an item-type associated with each node and an edges-data reference referencing said edge data within said edges integer array; and inserting said node data into said nodes integer array.

19. The non-transitory computer-readable storage medium of claim 18, wherein for each node that represents a recommendable item, said node data further comprises a recommendable-item-type reference referencing a species of recommendable-item.

20. The non-transitory computer-readable storage medium of claim 19, wherein iterating over each node includes further performing at least the following steps for each node that represents a recommendable item:

inserting, into the species integer array corresponding to said species of recommendable-item, a node-data reference to said node data within said nodes integer array.

21. The non-transitory computer-readable storage medium of claim 20, wherein for each node that represents a recommendable item:

said node data further comprises a reference to said node-data reference within said species integer array.

22. The non-transitory computer-readable storage medium of claim 17, wherein the instructions that configure the processor to traverse only a highly-weighted portion of said recommendations graph that is proximate to said entry node further comprise instructions configuring the processor to:

determine a batch count ("N") and a depth limit; and from any given node:
order outbound weighted edges according to said edge-weight metadata associated therewith; and follow only a top "N" outbound weighted edges, as ordered, and only when a length of a path from said entry node to any given node is less than said depth limit.

* * * * *